US008086669B2

(12) United States Patent
Huster

(10) Patent No.: US 8,086,669 B2
(45) Date of Patent: Dec. 27, 2011

(54) MULTI-PROTOCOL PRINT CLIENT-SERVER COMMUNICATION

(75) Inventor: Karsten Huster, Bad Iburg (DE)

(73) Assignee: Canon Europa, N.V., Amstelveen (NL)

( * ) Notice: Subject to any disclaimer, the term of this patent is extended or adjusted under 35 U.S.C. 154(b) by 0 days.

(21) Appl. No.: 12/580,961

(22) Filed: Oct. 16, 2009

(65) Prior Publication Data

US 2010/0100588 A1    Apr. 22, 2010

(30) Foreign Application Priority Data

Oct. 17, 2008    (EP) .................................... 08253373

(51) Int. Cl.
*G06F 15/16* (2006.01)
(52) U.S. Cl. ........................ 709/203; 709/227
(58) Field of Classification Search .................. 709/201, 709/203, 227, 228, 230, 236, 237, 250; 719/231, 719/328, 330; 340/1.1–16.1; 712/28
See application file for complete search history.

(56) References Cited

U.S. PATENT DOCUMENTS 6,219,706 B1 *   4/2001   Fan et al. ...................... 709/225
6,704,786 B1 *   3/2004   Gupta et al. .................. 709/228
2002/0080391 A1   6/2002   Takayuki
2007/0249345 A1 *  10/2007   Wada ......................... 455/435.1
2008/0184248 A1   7/2008   Ankur et al.

OTHER PUBLICATIONS

Ntware Systemprogrammierung GmBH "Overview Network Ports" [Online] vol. 1.02, Nov. 23, 2004, pp. 1 to 7, XP002519478.
Canon Deutschland GmBH "Uniflow Output Manager" [Online] May 2007, pp. 1-8, XP002519479.
European Search Report dated Mar. 16, 2009, Application No. EP08253373.8.

* cited by examiner

*Primary Examiner* — Jude Jean Gilles
*Assistant Examiner* — Thomas Lee, IV
(74) *Attorney, Agent, or Firm* — Fitzpatrick, Cella, Harper & Scinto

(57) ABSTRACT

A method of communicating between a print client and a print server is described. The method comprises obtaining an indication of the viability of communication of User Datagram Protocol (UDP) messages from the server to the client. If the indication is that UDP messages are viable, messages are sent from the server to the client using UDP. Otherwise a Hypertext Transfer Protocol (HTTP) request is made from the client to the server, that request is left open, and when the server wishes to send a message to the client, the message is sent as the response to the open HTTP request.

14 Claims, 2 Drawing Sheets

MULTI-PROTOCOL PRINT CLIENT-SERVER COMMUNICATION

BACKGROUND OF THE INVENTION

The present invention relates to communication between a print server and print clients on a computer network.

In a known print server system 1 (See FIG. 1) a print server 3 acts as an intermediary between clients 2 and one more printers 8 in arranging for print jobs generated on the clients 2 to be printed on the printers. The server 3 provides functions such as queuing of jobs and logging of the amounts of printing done.

In this known system the client 2 communicates with the print server 3 by means of an open HTTP request 4, i.e. one in which the server does not immediately send a response leaving the possibility of a later response. (HTTP stands for the "Hypertext Transfer Protocol".) This means that each client keeps a respective HTTP request to the server open and waits for information 5 to be transmitted back to it from the server 3 via this open HTTP request, i.e. as the HTTP response. The information 5 transmitted back to the client may be, for example, about some event, such as the completion of a print job, and so on. The information may be in the form of an HTML page which is displayed to the user as a popup window. An example of that would be a job ticket for a print job with input fields for print settings (e.g. stapling, duplex printing etc.); when the user the user has completed those the setting data is returned to the server in HTML format. The "UNIFLOW OM"® (trademark) print servers and clients are ones that use this form of HTTP communication.

BRIEF SUMMARY OF THE INVENTION

Advantages of this client notification mechanism are (i) that it is generally communicated through firewalls because it uses standard HTTP, which of course nearly all firewalls are set to pass, and (ii) that it works via NAT (Network Address Translation) because the connection between the client to the server is established by the client, not the other way around, so the client can easily sit behind a NAT/firewall router 6 and make its connection to the server.

The disadvantage of this mechanism is that the HTTP request from each client consumes a respective TCP/IP connection socket 7 on the server, which is kept open for an extended period while waiting for activity, causing, in large environments, a large allocation of sockets. Such environments may have thousands of clients connected to a print server, and this may give rise to a further problem which is that the operating system may well impose a limit on the number of sockets; one such limit is 4096 sockets. Additionally, there is also some network bandwidth used for refreshing these HTTP connections, as every connection is kept open for only a maximum of 1 minute before it is refreshed by opening a new TCP connection. Thus, for each client refresh a few TCP packets are transmitted between the client and the server.

According to the present invention there is provided a method of communicating between a print client and a print server, the method comprising:
  obtaining an indication of the viability of communication of User Datagram Protocol (UDP) messages from the server to the client,
  if the indication is that UDP messages are viable, sending messages from the server to the client using UDP,
  otherwise making an Hypertext Transfer Protocol (HTTP) request from the client to the server, leaving that request open, and when the server wishes to send a message to the client, sending that message as the response to the open HTTP request.

The obtaining of the indication may comprise sending one or more UDP messages from the client to the server, responding to the or each such message by the server sending a UDP message back to the client, and deciding on the basis of whether the response or responses are received or not, whether the communication of UDP messages from the server to the client is viable.

The method may include sending a UDP registration message from the client to the server using UDP, the registration message indicating that the client is requesting to use UDP communication.

The method may include the server sending a confirmation message to the client using UDP in response to the UDP registration message.

The method may include deciding on the basis of, or taking into account, whether the UDP confirmation message is received by the client or not, whether the communication of UDP messages from the server to the client is viable.

The method may comprise sending a message from the client to the server requesting the number of a port to which certain HTTP requests from the client to the server should be made, and sending a message from the server to the client indicating that port. The message from the server to the client indicating the port for HTTP requests may be made using UDP. The method may include deciding whether the communication of UDP messages from the server to the client is viable on the basis of, or taking into account, whether the message from the server to the client indicating the port for HTTP requests is received by the client or not.

The said UDP message from the client to the server may record as the source port a port on which the client is set to listen for UDP messages from the server in order to indicate to a filtering device between the server and the client that certain UDP messages from the server to the client should not be filtered out.

The method may comprise sending a UDP message from the client to the server wherein the message records as the source port a port on which the client is set to listen for UDP messages from the server in order to indicate to a filtering device between the server and the client that certain UDP messages from the server to the client should not be filtered out.

The method may comprise sending, in the case that UDP messaging from the server to the client is being used, a UDP message from time to time to the client from the server in order to indicate to a filtering device between the server and the client that certain UDP messages from the server to the client should not be filtered out.

The present invention also provides a system comprising a print client and a print server, wherein:
  the client and the server are arranged to co-operate to obtain an indication of the viability of communication of User Datagram Protocol (UDP) messages from the server to the client,
  the server is arranged, if the indication is that UDP messages are viable, to send messages to the client using UDP,
  the client is arranged, if the indication is otherwise, to make an Hypertext Transfer Protocol (HTTP) request to the server and to leave that request open, and the server is arranged to send a message to the client, when the server so wishes, as the response to the open HTTP request.

The client may be arranged to send one or more UDP messages from the client to the server, and the server may be arranged to respond to the or each such message by sending a UDP message back to the client; the client may also be arranged to decide on the basis of whether the response or responses are received or not, whether the communication of UDP messages from the server to the client is viable.

The client may be arranged to send a UDP registration message to the server using UDP, the registration message indicating that the client is requesting to use UDP communication. The server may be arranged to send a confirmation message to the client using UDP in response to the UDP registration message. The client may be arranged to decide on the basis of, or taking into account, whether the UDP confirmation message is received by the client or not, whether the communication of UDP messages from the server to the client is viable.

The client may be arranged to send a message to the server requesting the number of a port to which certain HTTP requests from the client to the server should be made, and the server may be arranged to respond to that request by sending a message to the client indicating that port. The server may be arranged to send the message to the client indicating the port for HTTP requests using UDP. The client may be arranged to decide on the basis of, or taking into account, whether the message from the server to the client indicating the port for HTTP requests is received by the client or not, whether the communication of UDP messages from the server to the client is viable.

The client may be arranged to record a port on which the client is set to listen for UDP messages from the server in the said UDP message to the server in order to indicate to a filtering device between the server and the client that certain UDP messages from the server to the client should not be filtered out.

The client may be arranged to send a UDP message to the server wherein the message records as the source port a port on which the client is set to listen for UDP messages from the server in order to indicate to a filtering device between the server and the client that certain UDP messages from the server to the client should not be filtered out.

The server may be arranged to send, in the case that UDP messaging from the server to the client is being used, a UDP message from time to time to the client in order to indicate to a filtering device between the server and the client that certain UDP messages from the server to the client should not be filtered out.

The present invention further provides a print client that is arranged to co-operate with a print server to obtain an indication of the viability of communication of User Datagram Protocol (UDP) messages from the server to the client,
the client being arranged, if the indication is that UDP messages are viable, to expect UDP messages from the server,
the client being arranged, if the indication is otherwise, to make an Hypertext Transfer Protocol (HTTP) request to the server and to leave that request open, and to receive a message from the server, when the server so wishes, as the response to the open HTTP request.

The client may be arranged to send one or more UDP messages to the server, and to decide on the basis of whether a UDP response or responses, to that message or those messages, from the server are received or not, whether the communication of UDP messages from the server to the client is viable.

The client may be arranged to send a UDP registration message to the server using UDP, the registration message indicating that the client is requesting to use UDP communication. The client may be arranged to decide on the basis of, or taking into account, whether a confirmation message from the server is received by the client by UDP or not, whether the communication of UDP messages from the server to the client is viable. The client may be arranged to send a message to the server requesting the number of a port to which certain HTTP requests from the client to the server should be made. The client may be arranged to decide on the basis of, or taking into account, whether a message from the server to the client indicating the port for HTTP requests is received by the client by UDP or not, whether the communication of UDP messages from the server to the client is viable.

The client may be arranged to record, in the said UDP message to the server, a port on which the client is set to listen for UDP messages from the server, in order to indicate to a filtering device between the server and the client that certain UDP messages from the server to the client should not be filtered out.

The client may be arranged to send a UDP message to the server wherein the message records as the source port a port on which the client is set to listen for UDP messages from the server in order to indicate to a filtering device between the server and the client that certain UDP messages from the server to the client should not be filtered out.

The present invention also provides a print server that is arranged to co-operate with a print client to obtain an indication of the viability of communication of User Datagram Protocol (UDP) messages from the server to the client,
the server being arranged, if the indication is that UDP messages are viable, to send messages to the client using UDP,
the server being arranged, if the indication is otherwise, to receive an Hypertext Transfer Protocol (HTTP) request from the client and to leave that request open, and to send a message to the client, when the server so wishes, as the response to the open HTTP request.

The server may be arranged to respond to one or more UDP messages received from the client by sending a UDP message back to the client.

The server may be arranged to send a confirmation message to the client by UDP in response to a UDP registration message sent to the server using UDP, the registration message indicating that the client is requesting to use UDP communication.

The server may be arranged to respond to a request from the client for the number of a port to which certain HTTP requests from the client to the server should be made by sending a message to the client indicating that port. The server may be arranged to send the message to the client indicating the port for HTTP requests using UDP.

The server may be arranged to send, in the case that UDP messaging from the server to the client is being used, a UDP message from time to time to the client in order to indicate to a filtering device between the server and the client that certain UDP messages from the server to the client should not be filtered out.

The present invention also provides a set of computer program products that when executed on a print client and a print server performs the steps of method of the invention. The present invention provides a computer program product that when executed on a device provides the print client of the invention and a computer program product that when executed on a device provides the print server the invention.

BRIEF DESCRIPTION OF THE DRAWINGS

There will now be described an example of the invention, with reference to the accompanying drawings, of which.

DETAILED DESCRIPTION OF THE INVENTION

Figure 1:
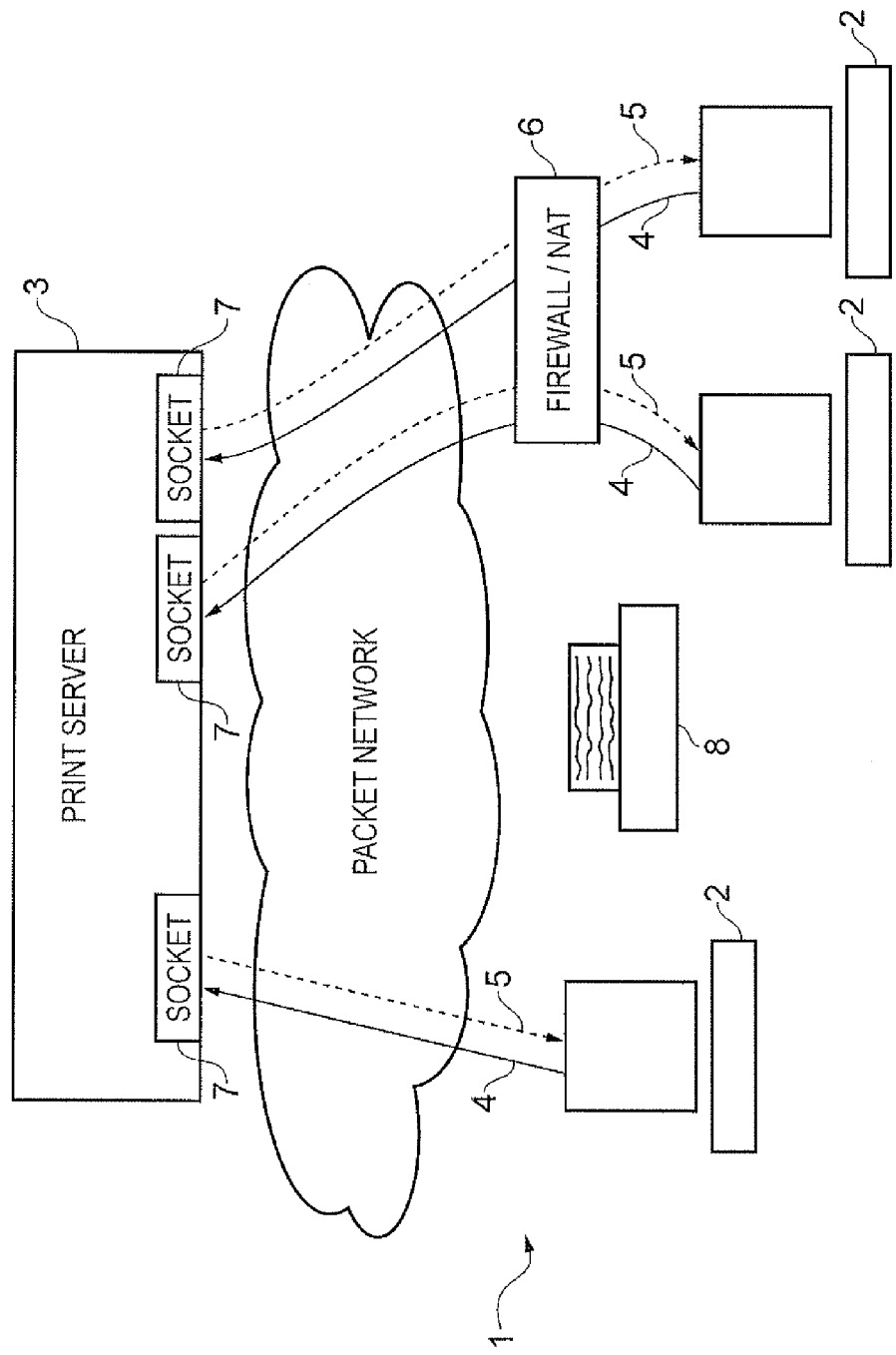
FIG. 1 shows a known print client-server system.
Figure 2:
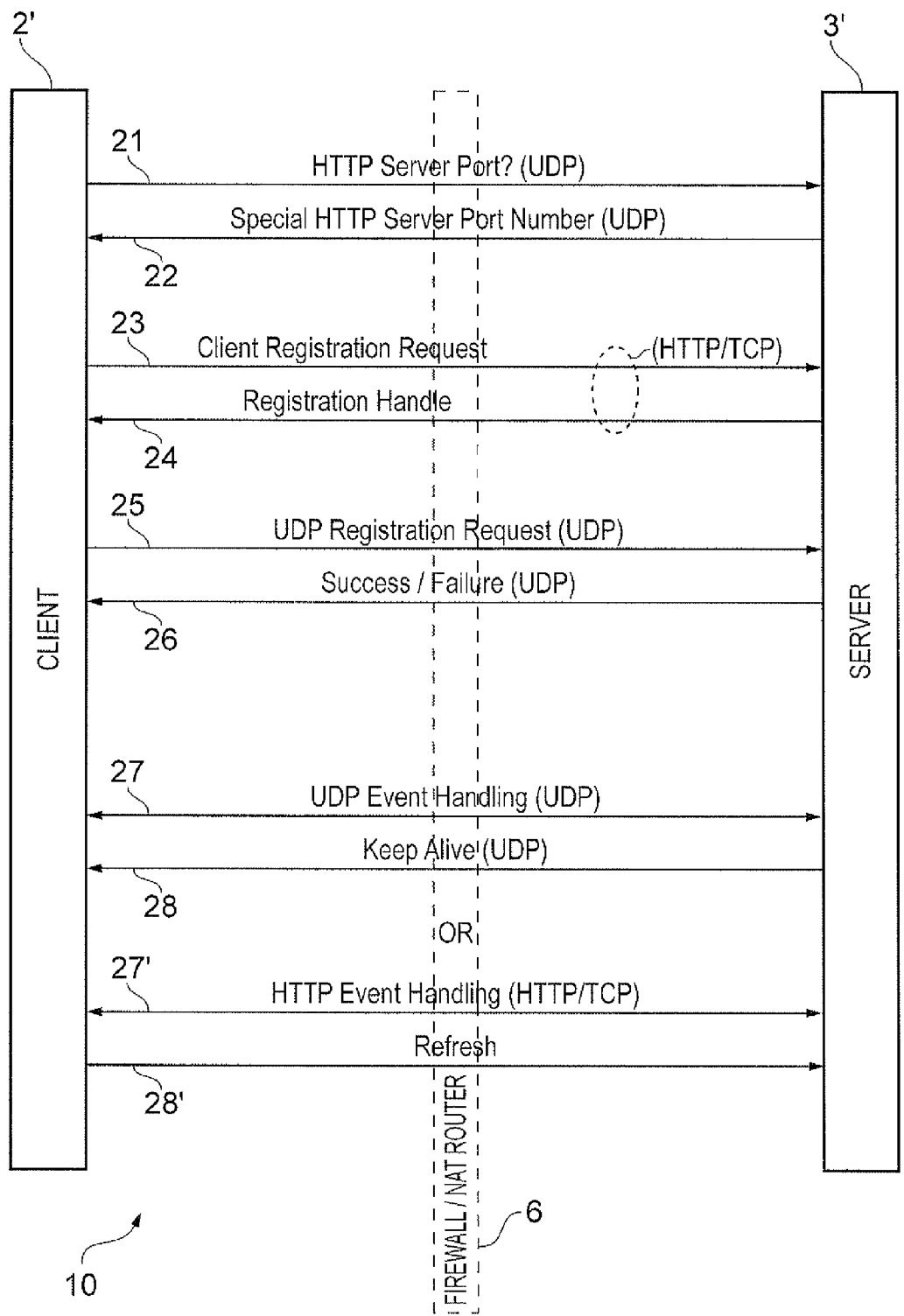
FIG. 2 shows operations in print client-server system in accordance with the present invention.

FIG. 2 shows operations in a print client-server system 10 in accordance with the present invention. Again, as in the system 1 of FIG. 1, communication is between a plurality of print clients 2' (potentially thousands thereof) and a print server 3'. The print clients will usually form part of a general purpose computer that requires printing services, for example, the workstation of an office worker. The print server will often form part of a general purpose computer, for example, a server computer, but can also be embedded in a print device—i.e. in FIG. 1 items 8 and 3 are provided in the same unit. For simplicity only a single client 2' is shown in FIG. 2.

FIG. 2 shows a series of requests from a particular client and the responses of the server for a series of initialisation steps, followed by general communication of messages concerning actual printing or related matters. As will be seen, depending on the conditions found by the client and the server, these messages are passed either using UDP 27 or HTTP 27', the former being used in preference to the later.

A firewall/router 6 is shown between the client and the server. This is in dashed outline because for some clients there may well be such a device on the route between the client and the server, while for other clients there may not be. Note that, as is known, routers and firewalls can be separate devices or may be combined in the same device, so one or other or neither of those may be one the route between the client and the server.

In a first initialisation step 21, 22 the client 2' sends an interrogation request 21 to the server 3' asking for the number of a special HTTP port that the server is using to support HTTP requests to the print server 3'. This message is sent by UDP, which stands for the "User Datagram Protocol". The server 3' responds to the request with a message 22, also using UDP, giving the requested port number (or an error message). The client records, for future reference, either the special HTTP port number or a failure. The latter may be either because an error message has been returned or because no reply has been received. UDP is a connectionless transport protocol and so is not reliable—if the UDP request datagram 21 or the UDP reply datagram 22 is dropped by the network then the client will not get any answer to its request with the result that the interrogation request fails. Either datagram may be dropped either due to network congestion or by being filtered out by any firewall 6 on the route between the client and the server.

The UDP request 21 is made to a predetermined port number on the server to which the server is set to listen for such requests. The client is also set to listen for the response 22 on a particular port number. Preferably this latter port number is recorded in the request UDP datagram 21 as the source port. This is because firewalls are often set to allow UDP datagrams from an external station addressed to a particular port on an internal station if that station has specified that particular port as the source port in a recent outgoing UDP datagram to that external station.

Next in a second initialisation step, the client sends a client registration message 23 to the server 3' using HTTP. If the special port number has been successfully provided to the client in the first initialisation step then that special port number is used for this HTTP request, otherwise the standard port number of 80 is used. The registration message 23 provides all the usual information needed to register the client and is not, or need not be, any different to that used in an existing print server, such as the "Uniflow OM" server. The details given in the request include account identification and verification and so on. Again as with the "Uniflow OM" server, the response 24 is to provide registration handle for use in later communications between the client and the server. The response 24 provided as the HTTP response to the HTTP request 23.

Sending the registration message over HTTP provides backward compatibility if a client in accordance with the invention is used with a server of the known kind that only uses HTTP for communications with clients. It is also highly reliable. The HTTP request 23 and response 24 are sent, as is usual for HTTP requests, over a TCP ("Transmission Control Protocol") connection at the transport level, the same connection being used for the request and the response. This TCP connection provides reliability by resending packets if they are dropped owing to congestion. Firewalls are also generally set to allow all TCP connections initiated from the internal side, whatever the port being used and so are unlikely to obstruct this initialisation step.

In the third initialisation step the client sends a UDP registration request 25, using UDP. This is a request to use UDP, rather than HTTP, for some, if not all, subsequent communications between the client and server (for example, event notifications from the server to the client). This request includes the registration handle received during the previous registration step. The reply 26, which is also sent by UDP indicates to the client whether the server has acceded to the request to use UDP in future. Generally if the UDP function is operational on the server, the server will accede and send the response 26 accordingly.

Following the third initialisation step the client 2' knows whether UDP communications with the server 3' are possible and are to be used.

If that is the case then the client does not set up an open HTTP request 4 to the server to provide a channel for notifications 5 from the server. Therefore no socket 7 is maintained on the server 3' in respect of that open HTTP request and therefore the resources it would have used are saved. When there are thousands of clients this is an important benefit. Thereafter the client and server send each other messages 27, from time to time, concerning printing and related matters. These messages can use any predetermined port numbers. This port number (for one direction) can be a single number, or more than one can be used for different classes of message. For similar reasons noted above in respect of the first initialisation request 21, 22, in order to persuade any firewall not to block UDP messages to the client from the server, from time to time (preferably every 2 minutes), the server sends a short packet 28 to the client quoting the port number on which the client is listening for UDP messages from the server as the destination port field of the packet. (If there is more than one such port on which the client is listening then the server sends such a short packet for each.)

In particular the UDP notifications 27 that are sent to the client by the server either (i) indicate the necessary information in the notifications datagram itself or (ii) are in a form indicating a particular HTTP request is to be made by the client to the server. In case (ii) the client makes the HTTP request to the server. The response to that HTTP request then provides the client with the information required, or in some cases provides a web page for display directly to the user, either to inform the user, or as a web form to be filled in by the user. These HTTP requests are not kept open longer than necessary (i.e. there is no waiting for notification from the server to the client of some further event) and so minimize the consumption of resources on the server.

On the other hand, if UDP communications are not indicated by the initialisation steps the client 2' proceeds to set up an open HTTP request 4 for the receipt of notifications 5 from the server 3' in the manner of the known system of FIG. 1 (symbolised in FIG. 2 by double headed arrow 27'). The server then uses the open HTTP request to send any notifications as an HTTP response. The client sends any message it wishes to send to the server as an HTTP request. These exchanges are shown at 27' in FIG. 2.

On receipt of the HTTP request that is left open, the server records that the client has decided to use HTTP rather than UDP to receive notifications from the server. Thereafter the server acts accordingly by sending print notifications to the client by the HTTP route and not by UDP.

Again the open HTTP is refreshed 28' from time to time in order to keep it open by opening a new TCP connection.

In this way resources used on the server are reduced by using UDP for the clients that can use UDP, while the ability of the server to communicate with clients that cannot use UDP is maintained by using HTTP for those clients. UDP is more likely to be a viable in environments where there are no firewalls or routers, for example, where the client and server are on the same local area network ("LAN"). Note that while the UDP refresh packets described above may keep a firewall open to allow UDP packets to reach a client, a router that is providing NAT ("network address translation") will in general be an obstacle to UDP communications; if it is an obstacle the system will detect that and will use HTTP instead.

In some circumstances it may be that although UDP communications are established that they stop working at a later time. The client 2' when sensing this (for example by noting that the keep alive packets 28 are not being received, or otherwise) repeats the initialisation process, which will result in the communications switching to being via HTTP (or if UDP is in fact still viable, in UDP communications be re-established).

In this example two of the initialisation messages involve UDP messages from the server to the client. The client decides that UDP messaging is viable if both of these are successful, but not otherwise. Other bases for the decision are possible. For example, the client can be arranged to decide that UDP is viable if one or other of those UDP messages arrives at the client, or if a particular one of the two arrives at the client. It can be decided upon the arrival of UDP messages other than those in the example.

In the above example the client is informed of a special port number for HTTP requests from the client to the server. The purpose of this is as follows. Normally HTTP requests are made to HTTP or "web" server on port 80. Examples of general purpose web servers include MICROSOFT's® Internet Information Server and APACHE®. These provide both standard delivery of predetermined web pages and scripting facilities that are used to provide an interface between HTTP requests and more complex application programs, which is what both the known print server 3 and the print server 3' of the present invention use. Nonetheless in order to provide a more efficient and scalable interface to the print server an optimised web server is provided as another interface to the print server 3 of the invention. The general purpose web server is set to listen on port 80, with the optimised print server being set to listen on a non-standard port, for example, port 8008. Thus in this preferred example the optimised web server does not replace the standard general purpose web server, so the administrator can use it for whatever other purposes they wish, and so that print clients that fail to receive the non-standard port number for the optimised web server can still work with the print server.

The invention claimed is:

1. A method of communicating between a print client and a print server, the method comprising:
    sending a message from the print client to the print server requesting a number of a Hypertext Transfer Protocol (HTTP) server port;
    sending a message from the print server to the print client indicating the HTTP server port;
    sending a client registration message from the print client to the print server using Transmission Control Protocol (TCP);
    sending a registration handle from the print server to the print client using Transmission Control Protocol (TCP), the registration handle for use in later communications between the print client and the print server;
    sending a User Datagram Protocol (UDP) registration request from the print client to the print server using UDP, the UDP registration request including the registration handle sent from the print server; and
    obtaining an indication of a viability of communication of UDP messages from the print server to the print client,
    when communication of UDP messages is viable, sending messages from the print server to the print client using UDP, and
    when communication of UDP messages is not viable, making an HTTP request from the print client to the print server, leaving the HTTP request open, and when the print server sends a message to the print client, sending the message as a response to the open HTTP request.

2. A method as claimed in claim 1 wherein the obtaining of the indication comprises sending one or more UDP messages from the print client to the print server, responding to the message by the print server sending a UDP message back to the print client, and deciding on the basis of whether the response or responses are received or not, whether the communication of UDP messages from the print server to the print client is viable.

3. A method as claimed in claim 2 wherein the UDP message from the print client to the print server records as the source port a port the print client is set to listen for UDP messages from the print server in order to indicate to a filtering device between the print server and the print client UDP messages from the print server to the print client using the port the print client is set to listen for UDP messages should not be filtered out.

4. A method as claimed in claim 1, the method further comprising sending by the print server a UDP confirmation message to the print client using UDP in response to the UDP registration request.

5. A method as claimed in claim 4, the method further comprising deciding whether the communication of UDP messages from the print server to the print client is viable on the basis of reception by the print client of the UDP confirmation message.

6. A method as claimed in claim 1 further comprising deciding whether the communication of UDP messages from the print server to the print client is viable on the basis of reception by the print client of the UDP message from the print server indicating the port for HTTP requests.

7. A method as claimed in claim 1, further comprising sending a UDP message from the print client to the print server wherein the message records as the source port a port the print client is set to listen for UDP messages from the print server in order to indicate to a filtering device between the print server and the print client UDP messages from the print server to the print client using the port the print client is set to listen for UDP messages should not be filtered out.

8. A method as claimed in claim 1, further comprising sending, in a case UDP messaging from the print server to the print client is being used, a UDP message from time to time to the print client from the print server in order to indicate to a filtering device between the print server and the print client UDP messages from the print server to the print client should not be filtered out.

9. A system comprising:
a client computer and a server computer, wherein:
the client computer and the server computer are associated and constructed to co-operate to obtain an indication of a viability of communication of User Datagram Protocol (UDP) messages from the server computer to the client computer for print services,
wherein the client computer is further constructed to send a message to the server computer requesting a number of a Hypertext Transfer Protocol (HTTP) server port,
wherein the server computer is further constructed to send a message to the client computer indicating the HTTP server port,
wherein the client computer is further constructed to send a client registration message to the server computer using Transmission Control Protocol (TCP),
wherein the server computer is further constructed to send a registration handle to the client computer using Transmission Control Protocol (TCP), the registration handle for use in later communications between the client computer and the server computer,
wherein the client computer is further constructed to send a UDP registration request to the server computer using UDP, the UDP registration request including the registration handle sent from the server computer,
wherein the server computer is further constructed to, when communication of UDP messages is viable, send messages to the print client using UDP,
wherein the client computer is further constructed to, when communication of UDP messages is not viable, make an HTTP request to the server computer and to leave the HTTP request open, and
wherein the server computer is further constructed to send a message to the client computer as a response to the open HTTP request.

10. The system of claim 9, wherein the server computer is in a common unit with a printer.

11. A client computer associated in a system with a server computer, the client computer constructed to co-operate with the server computer to obtain an indication of a viability of communication of User Datagram Protocol (UDP) messages from the server computer to the client computer for print services,
wherein the client computer is further constructed to send a message to the server computer requesting a number of a Hypertext Transfer Protocol (HTTP) server port and receive from the server computer a message indicating the HTTP server port,
wherein the client computer is further constructed to send a client registration message to the server computer using Transmission Control Protocol (TCP),
wherein the client computer is further constructed to receive a registration handle from the server computer using Transmission Control Protocol (TCP), the registration handle for use in later communications between the client computer and the server computer,
wherein the client computer is further constructed to send a UDP registration request to the server computer using UDP, the UDP registration request including the registration handle sent from the server computer,
wherein the client computer is further constructed to, when communication of UDP messages is viable, receive UDP messages from the server computer, and
wherein the client computer is further constructed to, when communication of UDP messages is not viable, make an HTTP request to the server computer and to leave the HTTP request open, and to receive a message from the server computer as a response to the open HTTP request.

12. The client computer of claim 11, wherein the server computer is in a common unit with a printer.

13. A server computer associated with a client computer, the server computer constructed to co-operate with the client computer to obtain an indication of a viability of communication of User Datagram Protocol (UDP) messages from the server computer to the client computer for print services,
wherein the server computer is further constructed to receive a message from the client computer requesting a number of a Hypertext Transfer Protocol (HTTP) server port and to send a message to the client computer indicating the HTTP server port;
wherein the server computer is further constructed to receive from the client computer a client registration message using Hypertext Transfer Protocol (Transmission Control Protocol (TCP));
wherein the server computer is further constructed to send a registration handle to the client computer using Transmission Control Protocol (TCP), the registration handle for use in later communications between the client computer and the server computer,
wherein the server computer is further constructed to receive a UDP registration request from the client computer using UDP, the UDP registration request including the registration handle sent from the server computer,
wherein the server computer is further constructed to, when communication of UDP messages is viable, send messages to the client computer using UDP, and
wherein the server computer is further constructed to, when communication of UDP messages is not viable, receive an HTTP request from the client computer and to leave the HTTP request open, and to send a message to the client computer as a response to the open HTTP request.

14. The server computer of claim 13, wherein the server computer is in a common unit with a printer.

* * * * *